United States Patent [19]

Takei et al.

[11] Patent Number: 5,767,183
[45] Date of Patent: Jun. 16, 1998

US005767183A

[54] HEAT SHRINKABLE SILICONE TUBE AND METHOD FOR MAKING

[75] Inventors: Hiroshi Takei; Noboru Shimamoto, both of Usui-gun; Yojiryo Ohtsuka, Takefu-shi, all of Japan

[73] Assignee: Shin-Etsu Chemical Co., Ltd., Tokyo, Japan

[21] Appl. No.: 570,573

[22] Filed: Dec. 11, 1995

[30] Foreign Application Priority Data

Dec. 12, 1994 [JP] Japan ................... 6-332148

[51] Int. Cl.$^6$ ................ C08K 3/22; C08L 83/06; B65B 53/02
[52] U.S. Cl. ............ 524/430; 524/494; 524/451; 524/437; 524/442; 524/560; 524/567; 524/582; 524/585; 524/588; 428/34.9
[58] Field of Search ................ 524/493, 430, 524/451, 494, 437, 442, 560, 567, 585, 582, 588, 860; 428/34.9

[56] References Cited

U.S. PATENT DOCUMENTS

| | | | |
|---|---|---|---|
| 3,326,869 | 6/1967 | Perrone | 525/106 |
| 3,998,513 | 12/1976 | Kobayashi et al. | 439/91 |
| 4,808,643 | 2/1989 | Lemione et al. | 524/87 |
| 4,840,381 | 6/1989 | Ihara et al. | 273/232 |

FOREIGN PATENT DOCUMENTS

| | | |
|---|---|---|
| 2 232 162 A | 12/1990 | United Kingdom. |
| 2 235 879 A | 3/1991 | United Kingdom. |
| 2 276 628 A | 10/1994 | United Kingdom. |

OTHER PUBLICATIONS

European Search Report. Appln. No. EP 95 30 8978, dated 11 Apr. 1996.
British Search Report. Appln. No. GB 9604787.3, dated 30 Apr. 1996.

Primary Examiner—Mark L. Warzel
Attorney, Agent, or Firm—Millen, White, Zelano & Branigan, P.C.

[57] ABSTRACT

A heat shrinkable silicone tube is prepared from a silicon rubber composition comprising (A) a diorganopolysiloxane, (B) a thermoplastic resin, (C) finely divided silica, (D) an inorganic filler of titanium white, alumina, quartz powder or talc having a mean particle size of 0.5–15 μm, and (E) a curing agent by extrusion molding the silicone rubber composition into a tubular shape preferably at a drawdown of 150–250%, vulcanizing the tube, and heat stretching the tube in a radial direction. The tube exhibits axial orientation during the stretching step and a shrinking step subsequent thereto and is thus tearable.

16 Claims, 1 Drawing Sheet

HEAT SHRINKABLE SILICONE TUBE AND METHOD FOR MAKING

BACKGROUND OF THE INVENTION

1. Field of the Invention

This invention relates to heat shrinkable silicone tubes which exhibit axial orientation during radial heat stretching and subsequent shrinking steps so that the tubes are axially tearable. It also relates to a method for preparing such heat shrinkable silicone tubes.

2. Background Art

It is well known in the art to mold heat shrinkable parts from silicone rubber compositions comprising silicone raw rubber in admixture with a thermoplastic resin such as polyethylene and silicone resins and a filler.

Most heat shrinkable tubes which have been proposed thus far have such nature that extrusion molded parts exhibit orientation in an axial direction as shown in FIG. 1, but heat stretched parts exhibit orientation in a radial direction as shown in FIG. 2. By the term "orientation" is meant a direction along which tubes are tearable. In FIGS. 1 and 2, the arrow denotes an orienting direction or tearable direction. Where a heat shrinkable tube is used as a resin mold adapted to achieve molding by utilizing the shrinking force of the heat shrinkable tube during the shrinking step, for example, the tube must be notched and torn off therefrom at the end of molding. Since the tube, however, tends to tear radially, removal of the tube takes some time, giving rise to a working problem. It is then desirable to develop a heat shrinkable tube which maintains axial orientation even in a shrinking step and is thus axially tearable, ensuring easy removal after use and efficient operation.

SUMMARY OF THE INVENTION

An object of the present invention is to provide a heat shrinkable silicone tube which exhibits axial orientation during both radial heat stretching and subsequent shrinking steps so that the tube is axially tearable and a method for preparing the heat shrinkable silicone tube.

The present invention is directed to a silicone rubber composition comprising a diorganopolysiloxane of the following average compositional formula (1):

$$R_aSiO_{(4-a)/2} \tag{1}$$

wherein R is a substituted or unsubstituted monovalent hydrocarbon group, at least 50 mol % of the entire monovalent hydrocarbon groups represented by R being a methyl group and 0.05 to 5.0 mol % of the entire monovalent hydrocarbon groups being a vinyl group, and letter a is an average number of 1.85 to 2.10, a thermoplastic resin, finely divided silica having a specific surface area of at least 100 m²/g, and a curing agent. The silicone rubber composition is further blended with an inorganic filler of titanium white, alumina, quartz powder or talc having a mean particle size of 0.5 to 15 μm. We have found that when the silicone rubber composition is molded into a tubular shape, vulcanized, and radially heat stretched or inflated, particularly when the composition is extrusion molded into a tubular shape at a drawdown of 150% to 250% as defined by [(nipple diameter/tube inner diameter)×100], vulcanized, and radially heat stretched, both the extrusion molded, vulcanized tube and the radially heat stretched tube exhibit orientation in a common axial direction. When the heat stretched tube is caused to shrink, its axial orientation is maintained during the shrinking step. Unlike prior art heat shrinkable tubes changing their orientation depending on a degree of shrinkage, the heat shrinkable tube of the invention is free of such a change of orientation, that is, maintains axial orientation independent of a degree of shrinkage and remains axially tearable.

In a first aspect, the present invention provides a heat shrinkable silicone tube which is prepared by a method comprising the steps of forming a silicone rubber composition into a tubular shape, vulcanizing the tube, and heat stretching the tube in a radial direction, the tube exhibiting axial orientation during the heat stretching step and a shrinking step subsequent thereto, the silicon rubber composition comprising (A) 100 parts by weight of a diorganopolysiloxane of formula (1) as defined above, (B) 10 to 100 parts by weight of a thermoplastic resin, (C) 5 to 50 parts by weight of finely divided silica having a specific surface area of at least 100 m²/g, (D) 5 to 150 parts by weight of an inorganic filler selected from titanium white, alumina, quartz powder and talc having a mean particle size of 0.5 to 15 μm, and (E) an effective amount of a curing agent for component (A).

In a second aspect, the present invention provides a method for preparing a heat shrinkable silicone tube comprising the steps of extrusion molding the silicone rubber composition into a tubular shape at a drawdown of 150% to 250% as defined by [(nipple diameter/tube diameter) ×100], vulcanizing the tube, and heat stretching the tube in a radial direction.

BRIEF DESCRIPTION OF THE DRAWINGS

These and further features of the present invention will be apparent with reference to the following description and drawings, wherein.

DETAILED DESCRIPTION OF THE INVENTION

Figure 1:
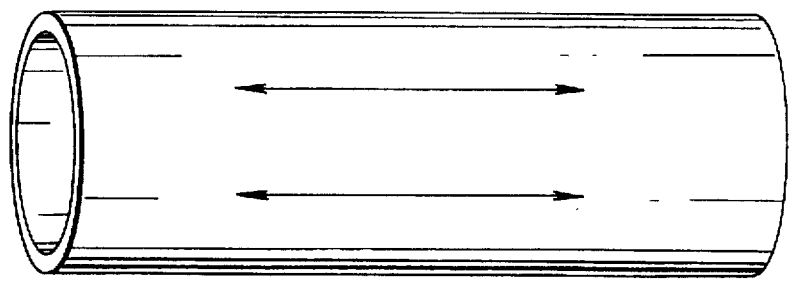
FIG. 1 is a perspective view of a tube illustrating its axial orientation.
Figure 2:
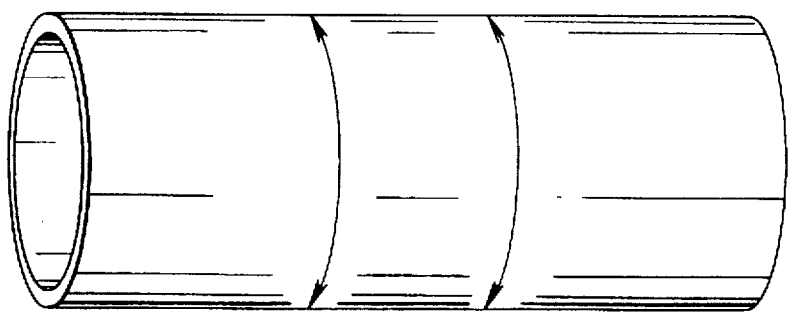
FIG. 2 is a perspective view of a tube illustrating its radial orientation.

The heat shrinkable silicone tube of the invention is formed of a silicon rubber composition comprising (A) diorganopolysiloxane, (B) thermoplastic resin, (C) finely divided silica, (D) inorganic filler, and (E) curing agent as main components. These components are described in detail.

Component (A) is a diorganopolysiloxane of the following average compositional formula (1):

$$R_aSiO_{(4-a)/2} \tag{1}$$

wherein R is a substituted or unsubstituted monovalent hydrocarbon group, at least 50 mol % of the entire monovalent hydrocarbon groups represented by R being a methyl group and 0.05 to 5.0 mol % of the entire monovalent hydrocarbon groups being a vinyl group, and letter a is an average number of 1.85 to 2.10.

More particularly, R is a substituted or unsubstituted monovalent hydrocarbon group, preferably having 1 to 10 carbon atoms, more preferably 1 to 6 carbon atoms, for example, alkyl groups such as methyl, ethyl, propyl and butyl, alkenyl groups such as vinyl and allyl, aryl groups such as phenyl and tolyl, aralkyl groups such as benzyl, and substituted ones of these groups wherein some or all of the hydrogen atoms are replaced by halogen atoms or cyano groups, such as trifluoropropyl and cyanoethyl. At least 50 mol % of the entire monovalent hydrocarbon groups represented by R is a methyl group and 0.05 to 5.0 mol %, especially 0.1 to 3.0 mol % of the entire monovalent hydrocarbon groups represented by R is a vinyl group. Letter a is an average number of 1.85 to 2.10. The diorganopolysiloxane (A) is essentially linear although it may be partially branched.

Preferably the diorganopolysiloxane has a viscosity of at least 1,000 centistokes at 25° C., especially 100,000 to 10,000,000 centistokes at 25° C.

Component (B) is a thermoplastic resin which is commonly used in conventional heat shrinkable silicone tubes. Exemplary resins include poly(methyl methacrylate), polyethylene, polypropylene, polystyrene, polyvinyl chloride, and various thermoplastic silicone resins. The thermoplastic resin is blended in an amount of 10 to 100 parts by weight, preferably 20 to 60 parts by weight per 100 parts by weight of component (A) or diorganopolysiloxane. Compositions containing less than 10 parts of the thermoplastic resin per 100 parts of the diorganopolysiloxane raw rubber will not result in molded parts having desirable heat shrinkability whereas compositions containing more than 100 parts of the thermoplastic resin per 100 parts of the diorganopolysiloxane will not show rubber elasticity.

Component (C) is finely divided silica having a specific surface area of at least 100 m$^2$/g as measured by BET method. It may be selected from silica species conventionally used in silicone rubber, for example, dry silica, typically fumed silica and wet silica. Also useful is silica which has been surface treated with silane, silazane and siloxane agents to be hydrophobic. Silica is blended in an amount of 5 to 50 parts by weight, preferably 10 to 40 parts by weight per 100 parts by weight of component (A) or diorganopolysiloxane. Less amounts of silica fail to provide strength necessary for stretching whereas more amounts of silica fail to provide elongation and other physical properties necessary for stretching.

Component (D) is an inorganic filler selected from the group consisting of titanium white, alumina, quartz powder and talc, and mixtures thereof. The filler is effective for imparting axial orientation and tearability to tubes. The filler should have a mean particle size of 0.5 to 15 μm, preferably 1 to 10 μm, more preferably 2 to 8 μm. Filler particles of less than 0.5 μm in size are less prone to axial orientation whereas filler particles of more than 15 μm in size fail to provide acceptable strength, allowing tubes to rupture in the stretching step. The inorganic filler is blended in an amount of 5 to 150 parts by weight, preferably 10 to 100 parts by weight, more preferably 30 to 80 parts by weight per 100 parts by weight of component (A) or diorganopolysiloxane. Less than 5 parts of the filler is less effective for imparting axial orientation and tearability to tubes, failing to achieve the objects of the invention. More than 150 parts of the filler would allow tubes to rupture in the stretching step.

Component (E) is a curing agent for component (A). The curing agent serves as a crosslinking agent and/or a curing catalyst. It may be selected from well-known curing agents conventionally used for the curing of silicone rubber, for example, organic peroxides such as benzoyl peroxide and 2,4-dichlorobenzoyl peroxide. Where curing takes place through addition reaction, useful addition reaction crosslinking agents are combinations of an organohydrogenpolysiloxane having at least two hydrogen atoms each attached to a silicon atom in a molecule with a platinum catalyst such as platinum element and chloroplatinic acid. As to the amount of the curing agent added per 100 parts by weight of component (A) or diorganopolysiloxane, 0.1 to 3 parts by weight of peroxides are preferably added to the radical reaction system. In the addition reaction system, the organohydrogenpolysiloxane is added in such amounts that the molar ratio (SiH/SiVi) of hydrogen atom attached to a silicon atom (SiH group) to vinyl group in the diorganopolysiloxane (SiVi) may range from 1/2 to 5/1 and the platinum catalyst is added in amounts of 0.1 to 2,000 ppm as platinum metal.

In addition to the above-mentioned essential components (A) to (E), the silicone rubber composition of the invention may further contain other additives such as anti-aging agents, heat resistance enhancers and pigments in appropriate amounts.

These components are mixed by means of conventional mixers such as twin roll mills, kneaders, and Banbury mixers. For the purpose of facilitating uniform mixing, any of well-known dispersing agents such as low molecular weight siloxanes blocked with a hydroxyl group at each end, alkoxysilanes, silazanes and diphenylsilane diols may be blended, if desired.

According to the present invention, heat shrinkable tubes are prepared by forming the above-formulated silicone rubber composition into a tubular shape, vulcanizing the tube, and heat stretching or inflating the tube in a radial direction. In a preferred embodiment, the composition is extrusion molded into a tubular shape at a drawdown of 150% to 250%, more preferably 170% to 200% using an extruder which has a die and a nipple concentrically disposed therein to define an annular gap for extruding the material therethrough. The drawdown used herein is a percent of a nipple diameter divided by a tube inner diameter, i.e.

$$\text{Drawdown (\%)} = \frac{\text{nipple diameter}}{\text{tube inner diameter}} \times 100.$$

With a drawdown of less than 150%, a tube as extruded would have different orientation than the same tube as heat stretched. With a drawdown of more than 250%, tubes would have inconsistent diametrical configuration upon extrusion although both extruded and stretched tubes exhibit axial orientation. Any desired type of vulcanization may be selected depending on the curing system. A commonly used technique is heat curing at a temperature of at least 100° C. under atmospheric pressure. The tubular molded part is radially stretched while heating it at a temperature of 120° to 220° C. In the stretched state, the part is allowed to cool down, obtaining a heat shrinkable tubular molded part having axial orientation according to the invention.

The thus obtained heat shrinkable silicone tube having axial orientation will shrink substantially completely to the original shape prior to stretching when it is heated to 100° C. or higher by hot air or other suitable means. As compared with conventional heat shrinkable tubes having radial orientation prior to and during shrinkage and axial orientation after full shrinkage, the heat shrinkable silicone tubes of the invention exhibit axial orientation in the heat shrinking step independent of a degree of shrinkage. The tubes of the invention have the advantage of ease of tearing in such an application wherein after molding, the tube is torn off and disposed of, as mold formation utilizing the shrinking force of a heat shrinkable tube upon shrinkage.

There have been described heat shrinkable silicone tubes which experience no change of their orientation at any stage of a shrinking process, exhibit axial orientation and remain tearable. They are advantageously used in resin molding application where molding is performed utilizing the shrinking force. The method of the invention ensures that such heat shrinkable silicone tubes be manufactured in a simple manner.

EXAMPLE

Examples of the present invention are given below by way of illustration and not by way of limitation. All parts are by weight.

Example 1

A compound was prepared by mixing in a kneader 100 parts by weight of a dimethylpolysiloxane blocked with a dimethylvinylsilyl group at each end of its molecular chain and having a vinyl content of 0.4 mol % based on the entire monovalent hydrocarbon groups, an average degree of polymerization of 8,000, and a viscosity of 10,000,000 centistokes at 25° C., 30 parts by weight of fumed silica having a specific surface area of 200 m²/g as measured by BET, 50 parts by weight of methylphenylpolysiloxane resin, and 70 parts by weight of quartz powder having a mean particle size of 1.2 μm (trade name Crystalite VXS, manufactured by Tatsumori K.K.), followed by milling in a twin roll mill. This compound, 100 parts by weight, was mixed with 1.5 parts by weight of 2,4-dichlorobenzoyl peroxide to form a silicone rubber composition, which was formed into a sheet and cured by heating at 200° C. for 10 minutes and then at 200° C. for one hour. The thus obtained cured sheet was stretched by a factor of 2 while heating at 150° C., held by a jig, cooled to room temperature in that state, and then stress relieved. The cured sheet was measured for stretch retentivity and heat shrinkage factor, and the heat shrunk one was measured for rubber properties according to JIS C 2123. The results are shown in Table 1.

Comparative Example 1

A cured sheet was prepared by the same procedure (including formulation and forming conditions) as in Example 1 except that the filler having a mean particle size of 1.2 μm was omitted. Measurement was done as in Example 1. The results are shown in Table 1.

It is noted that the stretch retentivity and heat shrinkage factor are calculated according to the following expressions.

Stretch retentivity=$(L_2-L_0)/(L_1-L_0) \times 100\%$

Heat shrinkage factor=$(L_2-L_3)/(L_2-L_0) \times 100\%$ $L_0$: original length between two gage marks
$L_1$: length between two gage marks when stretched 200% and held by a jig
$L_2$: length between two gage marks when removed from the jig
$L_3$: length between two gage marks after heating at 200° C. and cooling.

TABLE 1

|  | CE 1 | E 1 | E 3 |
|---|---|---|---|
| Stretch retentivity, % | 89 | 79 | 78 |
| Heat shrinkage factor, % | 44 | 43 | 45 |
| Tensile strength, kgf/cm² | 42 | 30 | 28 |
| Tear strength, kgf/cm² | 23 | 10 | 8 |

As is evident from Table 1, the cured sheet of the invention (Example 1) possesses tearability and sufficient stretch characteristics to use as heat shrinkable molded parts.

Example 2

The silicone rubber composition obtained in Example 1 was extrusion molded by using an extruder having an extrusion die of 7.5 mm in diameter and a nipple of 4.0 mm in diameter and setting the tube inner diameter to 2.7 mm, 2.2 mm, and 2.0 mm. The molded tubes were passed through a heat vulcanizing tower at 450° C., obtaining vulcanized tubes having a drawdown of 150%, 180% and 200%. Note that the drawdown is the nipple diameter divided by the tube inner diameter×100%. All the tubes had orientation (tearable direction) in an axial direction.

Each of the tubes was placed in a stainless steel pipe having an inner diameter of 6.8 mm and a length of 1 m and heated at 200° C. Air was pumped into the tube to a pressure of 3.0 kg/cm² to inflate or stretch the tube. In the pressurized state, the tube was cooled to room temperature. The resulting heat shrinkable tubes all had an inner diameter of 5.3 mm and exhibited orientation in an axial direction like the extrusion molded ones. They were then shrunk by heating at 200° C. The shrunk tubes had an inner diameter of 3.0 mm, 2.7 mm, and 2.5 mm and exhibited orientation in an axial direction like the extrusion molded ones and the stretched ones. The results are shown in Table 2.

Example 3

A compound was prepared by mixing in a kneader 100 parts by weight of a dimethylpolysiloxane blocked with a dimethylvinyl group at each end of its molecular chain and having a vinyl content of 0.4 mol % based on the entire monovalent hydrocarbon groups, 30 parts by weight of finely divided silica, 50 parts by weight of an organopolysiloxane resin, and 50 parts by weight of a filler having a mean particle size of 3.2 μm (trade name Min-u-Sil, manufactured by Pennsylvania Glass Sand Co.), followed by milling in a twin roll mill. This compound, 100 parts by weight, was mixed with 1.5 parts by weight of 2,4-dichlorobenzoyl peroxide to form a silicone rubber composition, which was formed into a sheet and cured by heating at 200° C. for 10 minutes and then at 200° C. for one hour. The resulting cured sheet was measured for rubber properties as in Example 1. The results are shown in Table 1.

Next, the silicone rubber composition obtained above was extrusion molded and heat stretched as in Example 2. As in Example 2, when tubes were prepared by extrusion molding at a drawdown in the range of 150% to 200%, both the extruded and stretched parts exhibited the same orientation. There were obtained heat shrinkable silicone tubes having consistent diametrical configuration.

Comparative Example 2

The silicone rubber composition obtained in Example 1 was extrusion molded by using an extruder having a die and a nipple as in Example 2 and setting the tube inner diameter to 3.3 mm, 3.2 mm, and 2.9 mm. By the same extrusion molding and vulcanizing as in Example 2, there were obtained vulcanized tubes having a drawdown of 120%, 130% and 140%. All the tubes had orientation in an axial direction.

The tubes were then stretched and shrunk as in Example 2. The tubes exhibited radial orientation as stretched and axial orientation as shrunk. The results are shown in Table 3.

A similar procedure was carried out while setting the tube inner diameter to 1.5 mm which corresponded to a drawdown of 270%. Both the extruded and stretched tubes exhibited axial orientation although the extruded tubes were inconsistent in configuration and impractical.

Comparative Example 3

The silicone rubber composition of Comparative Example 1 was extrusion molded by using an extruder having a die and a nipple as in Example 2 and setting the tube inner diameter to 3.3 mm and 2.0 mm. By the same extrusion molding and vulcanizing as in Example 2, there were obtained vulcanized tubes having a drawdown of 120% and 200%. All the tubes had orientation in an axial direction.

The tubes were then stretched and shrunk as in Example 2. The tubes exhibited radial orientation as stretched and axial orientation as shrunk. The results are shown in Table 4.

Comparative Example 4

The silicone rubber composition of Example 3 was extrusion molded by using an extruder having a die and a nipple as in Comparative Example 2. By the same extrusion molding and vulcanizing as in Examples 2 and 3, there were obtained vulcanized tubes having a drawdown in the range of 120% to 140%. All the tubes had orientation in an axial direction.

The tubes were then stretched and shrunk as in Examples 2 and 3. In contrast to Examples 2 and 3 wherein the tubes extrusion molded at a drawdown in the range of 150% to 200% exhibited axial orientation whether they were as extruded, stretched or shrunk, the tubes of this Comparative Example exhibited axial orientation as extruded, radial orientation as stretched and axial orientation as shrunk. The results are shown in Table 3.

TABLE 2

|  | Examples 2 and 3 | | |
| --- | --- | --- | --- |
| Drawdown | 150% | 180% | 200% |
| Extruded tube | axial | axial | axial |
| stretched tube | axial | axial | axial |
| Shrunk tube | axial | axial | axial |
| Nipple diameter, mm | 4.0 | 4.0 | 4.0 |
| Tube inner diameter, mm | 2.7 | 2.2 | 2.0 |

TABLE 3

|  | Comparative Examples 2 and 4 | | |
| --- | --- | --- | --- |
| Drawdown | 120% | 130% | 140% |
| Extruded tube | axial | axial | axial |
| Stretched tube | radial | radial | radial |
| Shrunk tube | axial | axial | axial |
| Nipple diameter, mm | 4.0 | 4.0 | 4.0 |
| Tube inner diameter, mm | 3.3 | 3.2 | 2.9 |

TABLE 4

|  | Comparative Example 3 | |
| --- | --- | --- |
| Drawdown | 120% | 200% |
| Extruded tube | axial | axial |
| Stretched tube | radial | radial |
| Shrunk tube | axial | axial |
| Nipple diameter, mm | 4.0 | 4.0 |
| Tube inner diameter, mm | 3.3 | 2.0 |

It is evident from Tables that with a drawdown during extrusion molding in excess of 150%, orientation changes before and after shrinkage (Comparative Example 2). Table 4 reveals that if the inorganic filler of 1.2 µm in size is omitted from the silicone rubber composition of which heat shrinkable silicone tubes are made, orientation changes before and after shrinkage despite the same drawdown of 200% (Comparative Example 3).

Japanese Patent Application No. 332148/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A heat shrinkable silicone tube which is prepared by a method comprising extrusion molding a silicone rubber composition into a tubular shape at a drawdown of 150% to 250%, as expressed in percent by a nipple diameter divided by a tube diameter×100, vulcanizing the tube, and heating stretching the tube in a radial direction, the tube exhibiting axial orientation during stretching and shrinking subsequent thereto, said silicone rubber composition comprising (A) 100 parts by weight of a diorganopolysiloxane of the following average compositional formula (1):

$$R_aSiO_{(4-a)/2} \qquad (1)$$

wherein R is a substituted or unsubstituted monovalent hydrocarbon group, at least 50 mol % of the entire monovalent hydrocarbon groups represented by R being a methyl group and 0.05 to 5.0 mol % of the entire monovalent hydrocarbon groups being a vinyl group, and letter a is an average number of 1.85 to 2.10, (B) 10 to 100 parts by weight of a thermoplastic resin, (C) 5 to 50 parts by weight of finely divided silica having a specific surface area of at least 100 m²/g, (D) 5 to 150 parts by weight of an inorganic filler selected from the group consisting of titanium white, alumina, quartz powder and talc, the filler having a mean particle size of 0.5 to 15 µm, and (E) an effective amount of a curing agent for component (A).

2. The tube of claim 1 wherein thermoplastic resin (B) is selected from the group consisting of poly(methyl methacrylate), polyethylene, polypropylene, polystyrene, polyvinyl chloride, and thermoplastic silicone resins.

3. The tube of claim 1 wherein curing agent (E) is an organic peroxide.

4. The tube of claim 1 wherein curing agent (E) is an organohydrogenpolysiloxane combined with a platinum catalyst.

5. A method for preparing a heat shrinkable silicone tube which comprises extrusion molding a silicone rubber composition into a tubular shape at a drawdown of 150% to 250% expressed in percent as nipple diameter divided by tube diameter×100, vulcanizing the tube, and heat stretching the tube in a radial direction, said silicone rubber composition comprising (A) 100 parts by weight of a diorganopolysiloxane of the following average composition formula (1):

$$R_aSiO_{(4-a)/2} \qquad (1)$$

wherein R is a substituted or unsubstituted monovalent hydrocarbon group, at least 50 mol % of the entire monovalent hydrocarbon groups represented by R being a methyl group and 0.05 to 5.0 mol % of the entire monovalent hydrocarbon groups being a vinyl group, and letter a is an average number of 1.85 to 2.10, (B) 10 to 100 parts by weight of a thermoplastic resin, (C) 5 to 50 parts by weight of finely divided silica having a specific surface area of at least 100 m²/g, (D) 5 to 150 parts by weight of an inorganic filler selected from the group consisting of titanium white, alumina, quartz powder and talc, the filler having a mean particle size of 0.5 to 15 μm, and (E) an effective amount of a curing agent for component (A).

6. The method of claim 5, wherein thermoplastic resin (B) is selected from the group consisting of poly(methyl methacrylate), polyethylene, polypropylene, polystyrene, polyvinyl chloride, and thermoplastic silicone resins.

7. The method of claim 5, wherein curing agent (E) is an organic peroxide.

8. The method of claim 5, wherein curing agent (E) is an organohydrogenpolysiloxane combined with a platinum catalyst.

9. The tube of claim 1, wherein the tube exhibits axial orientation and axial tearability independent of the degree of shrinking.

10. The method of claim 5, wherein the tube exhibits axial orientation and axial tearability independent of the degree of shrinking.

11. The tube of claim 1, wherein for the diorganopolysiloxane, (A), R is a monovalent hydrocarbon group of 1–10 carbon atoms, optionally substituted by halogen or cyano.

12. The method of claim 5, wherein for the diorganopolysiloxane, (A), R is a monovalent hydrocarbon group of 1–10 carbon atoms, optionally substituted by halogen or cyano.

13. The tube of claim 1, wherein the filler, (D), has a mean particle size of 1 to 10 μm.

14. The method of claim 5, wherein the filler, (D), has a mean particle size of 1 to 10 μm.

15. The tube of claim 1, wherein the filler, (D), is provided in the silicone rubber composition at 10–100 parts by weight.

16. The method of claim 5, wherein the filler, (D), is provided in the silicone rubber composition at 10–100 parts by weight.

* * * * *